(12) United States Patent
Raja et al.

(10) Patent No.: US 10,386,938 B2
(45) Date of Patent: Aug. 20, 2019

(54) TRACKING OF LOCATION AND ORIENTATION OF A VIRTUAL CONTROLLER IN A VIRTUAL REALITY SYSTEM

(71) Applicant: Google Inc., Mountain View, CA (US)

(72) Inventors: Samantha Raja, Mountain View, CA (US); Manuel Christian Clement, Felton, CA (US); Shanee Nishry, Mountain View, CA (US); Daniel Sternfeld, Mountain View, CA (US); Stefan Welker, Mountain View, CA (US); Kevin Horowitz, Mountain View, CA (US); Corentin Fatus, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 51 days.

(21) Appl. No.: 15/708,040

(22) Filed: Sep. 18, 2017

(65) Prior Publication Data
US 2019/0087019 A1    Mar. 21, 2019

(51) Int. Cl.
| G06F 3/0346 | (2013.01) |
| G06F 3/01 | (2006.01) |
| G06T 19/00 | (2011.01) |
| G06F 3/038 | (2013.01) |

(52) U.S. Cl.
CPC ............ *G06F 3/0346* (2013.01); *G06F 3/011* (2013.01); *G06F 3/012* (2013.01); *G06F 3/038* (2013.01); *G06F 3/0383* (2013.01); *G06T 19/006* (2013.01)

(58) Field of Classification Search
CPC ........ G06F 3/011; G06F 3/012; G06F 3/0346; G06F 3/038; G06F 3/0383; G06T 19/006
USPC .................................................. 345/156, 690
See application file for complete search history.

(56) References Cited

U.S. PATENT DOCUMENTS

| 6,042,555 | A | * | 3/2000 | Kramer | A61B 5/225 600/595 |
| 6,104,379 | A | * | 8/2000 | Petrich | G06F 3/014 345/156 |
| 7,701,441 | B2 | | 4/2010 | Balakrishnan et al. | |
| 9,552,673 | B2 | | 1/2017 | Hilliges et al. | |
| 9,690,367 | B2 | | 6/2017 | Pedrotti et al. | |
| 2004/0236541 | A1 | * | 11/2004 | Kramer | G06T 19/20 703/1 |

(Continued)

OTHER PUBLICATIONS

International Search Report and Written Opinion for International Application No. PCT/US2018/051361, dated Jan. 15, 2019, 14 pages.

*Primary Examiner* — Tony O Davis
(74) *Attorney, Agent, or Firm* — Brake Hughes Bellrmann LLP

(57) ABSTRACT

In at least one aspect, a method can include determining a location of a head mounted display (HMD) of a user, defining a location of a joint based on the location of the HMD, defining a segment from the joint to an end of the segment, defining an initial virtual location of a virtual controller within a virtual reality (VR) environment based on a location of the end of the segment, and defining a virtual location and a virtual orientation of the virtual controller within the VR environment, based on the segment and the joint, in response to an orientation movement of a physical controller.

16 Claims, 10 Drawing Sheets

(56) References Cited

U.S. PATENT DOCUMENTS

| | | | |
|---|---|---|---|
| 2008/0009771 A1* | 1/2008 | Perry | B25J 9/0006 600/587 |
| 2009/0128552 A1* | 5/2009 | Fujiki | G06T 19/006 345/419 |
| 2010/0245284 A1* | 9/2010 | Ito | G06F 3/0416 345/174 |
| 2011/0267356 A1* | 11/2011 | Rennuit | G06T 13/40 345/473 |
| 2011/0267357 A1* | 11/2011 | Rennuit | G06T 13/40 345/473 |
| 2011/0267358 A1* | 11/2011 | Rennuit | G06T 13/40 345/474 |
| 2012/0059515 A1* | 3/2012 | Abdallah | B25J 9/1633 700/255 |
| 2014/0055352 A1* | 2/2014 | Davis | G06F 3/017 345/156 |
| 2015/0070274 A1 | 3/2015 | Morozov | |
| 2015/0258431 A1* | 9/2015 | Stafford | A63F 13/213 463/31 |
| 2016/0054423 A1* | 2/2016 | Kang | G06T 7/73 382/203 |
| 2016/0098095 A1* | 4/2016 | Gonzalez-Banos | G06F 3/017 345/156 |
| 2016/0171770 A1 | 6/2016 | Pedrotti et al. | |
| 2016/0357261 A1* | 12/2016 | Bristol | A63F 13/24 |
| 2017/0003738 A1* | 1/2017 | Silkin | G06F 3/011 |
| 2017/0038253 A1* | 2/2017 | Mallinson | G06F 3/011 |
| 2017/0199580 A1 | 7/2017 | Hilliges et al. | |
| 2017/0228028 A1 | 8/2017 | Nakamura et al. | |
| 2017/0329488 A1* | 11/2017 | Welker | G06F 3/0304 |
| 2017/0358139 A1* | 12/2017 | Balan | G02B 27/0172 |
| 2018/0020978 A1* | 1/2018 | Kaifosh | A61B 5/7275 702/150 |
| 2018/0108179 A1* | 4/2018 | Tomlin | G02B 27/0172 |
| 2018/0126553 A1* | 5/2018 | Corkum | B25J 9/1697 |
| 2018/0165864 A1* | 6/2018 | Jin | G09G 5/00 |
| 2018/0311571 A1* | 11/2018 | Huang | A63F 13/213 |
| 2018/0314346 A1* | 11/2018 | Kirmani | G06F 3/017 |
| 2018/0321737 A1* | 11/2018 | Pahud | G06F 3/011 |

\* cited by examiner

US 10,386,938 B2

TRACKING OF LOCATION AND ORIENTATION OF A VIRTUAL CONTROLLER IN A VIRTUAL REALITY SYSTEM

TECHNICAL FIELD

This description relates to tracking three-dimensional location and orientation of a controller used in virtual reality (VR) systems.

BACKGROUND

In some VR systems, a user interacts with any number of virtual objects in a virtual environment using a head-mounted display (HMD) and a hand-held controller. In such VR systems, the user can interact with the objects via the HMD using the hand-held controller. There may be challenges in tracking the hand-held controller using only three degrees of freedom (3DOF) tracking (e.g., orientation tracking).

SUMMARY

In at least aspect, a method can include determining a location of a head mounted display (HMD) of a user, defining a location of a joint based on the location of the HMD, defining a segment from the joint to an end of the segment, defining an initial virtual location of a virtual controller within a virtual reality (VR) environment based on a location of the end of the segment, and defining a virtual location and a virtual orientation of the virtual controller within the VR environment, based on the segment and the joint, in response to an orientation movement of a physical controller.

The details of one or more implementations are set forth in the accompanying drawings and the description below. Other features will be apparent from the description and drawings, and from the claims.

DETAILED DESCRIPTION

Figure 1:
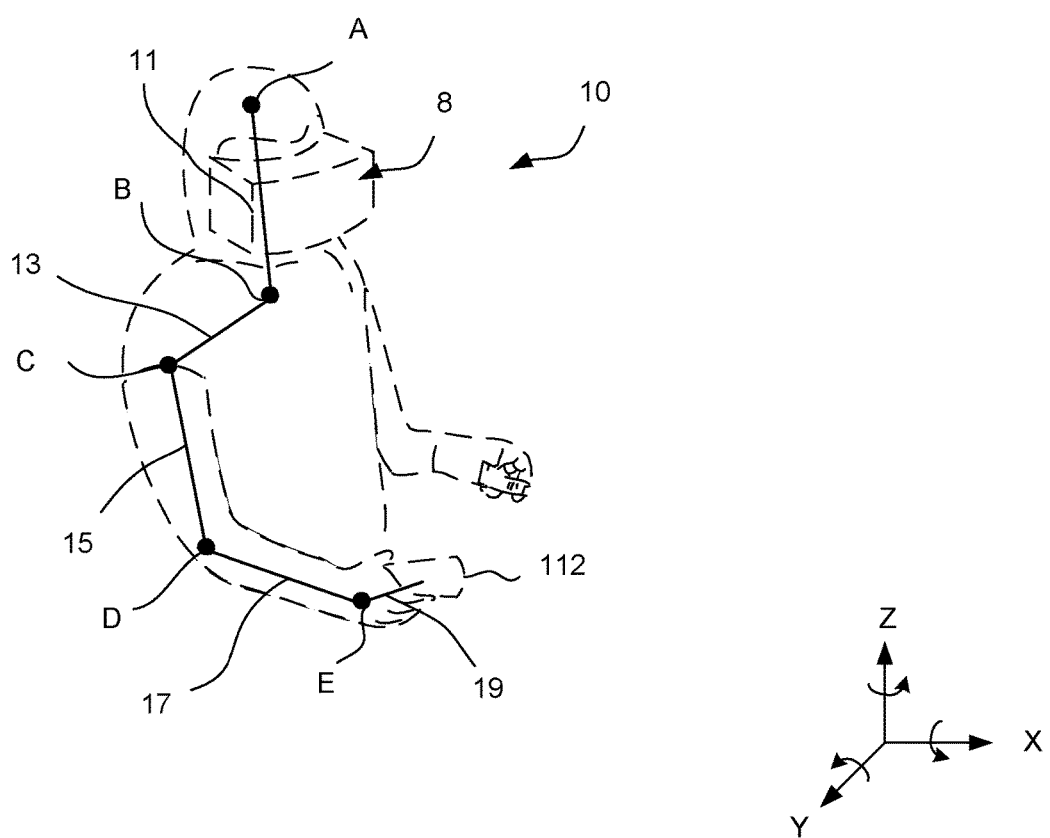
FIG. 1 illustrates a perspective view of an example VR arm model used to represent a right side of a user.

In the implementations described herein, a physical VR controller uses only three-degree of freedom (3 DOF) for tracking with rotation capability about x, y, and z-axes, commonly referred to as pitch, roll, and yaw. Accordingly, such physical controllers can track rotational movements. This orientation of the physical controller is determined essentially at a fixed location (also can be referred to as a position) in space because absolute position in space is not tracked by the physical controller or by a head-mounted display (HMD) associated with the physical controller. This 3 DOF tracking can be used, however, to estimate (or project) a location and orientation in space of a virtual controller as viewed within the HMD using a VR arm model. Accordingly, the 3 DOF tracking of the physical controller can be used to determine (e.g., estimate, represent) 6 DOF (e.g., x, y, z location and orientation) tracking of a virtual controller when viewed from within an HMD. In some implementations, the VR arm model can be referred to as a VR arm model.

For example, a user may view, via an HMD, the VR environment by tilting and turning their head in various ways. The tracking of virtual controller, however, within the view of the HMD can be limited because of the limited 3 DOF tracking capability of the VR controller—the physical controller does not track absolute location (e.g., locational tracking) in space. But the VR arm model can take advantage of the orientational tracking of the physical controller to create a location and orientation of the virtual controller that can be viewed within the HMD. Accordingly, in the implementations described herein, it is possible to simulate a person holding the controller at a location and orientation in the VR environment. Further, in the implementations described herein, the virtual controller may be in the VR environment at a location that corresponds to how a user holds and moves the physical controller.

In accordance with the implementations described herein, improved techniques of tracking a hand-held physical controller in a VR system can include, for example, defining a segment between an elbow joint (first joint) and a wrist joint (second joint). The segment and joints emulate and represent movements of the virtual controller. Some advantages of the improved techniques present a cheaper, more efficient, and/or simpler (e.g., requires little knowledge other than an orientation of the controller) system. Further, the improved techniques are straightforward to implement and have enough fidelity (e.g., accuracy) to be relatively immersive to the user. Additionally, in some implementations, there is no need for external sensors (e.g., external facing cameras from the HMD) to track the physical controller for using the improved VR system.

Further, in the implementations described herein, by determining and measuring at most three rotational movements, e.g., two at the elbow joint (first joint) and one at the wrist joint (second joint), more specifically, movements at z-axis and y-axis at the elbow joint and a movement at x-axis at the wrist joint, these can be used to accomplish an effective and relatively realistic virtual representation of movement of the physical controller in the VR environment. Although discussed in terms of a virtual environment, any of the techniques described herein can be applied to an augmented reality environment. In some implementations, the term virtual environment can be, or can include, an augmented reality environment.

FIG. 1 illustrates a perspective view of an example VR arm model 10 used to represent a user. Although illustrated on the right side of a user, the VR arm model 10 can be applied to the left side of the user. In this implementation, the user is wearing an HMD 8. Although not shown in FIG. 1, a location of the physical controller 112 can be viewed (e.g., represented) from within the HMD 8 as a virtual controller (not shown) by the user based on the VR arm model 10. The VR arm model 10 is shown in FIG. 1, for discussion purposes, but may not be viewed by the user via the HMD 8. In some implementations, the VR arm model 10 can be referred to as a skeletal model.

For the sake of illustration, without loss of generality, this description describes an example VR arm model to be a human model that is configured to resemble a body pose. The VR arm model, representing the human model, may include segments, each segment may be associated with a body part of the user. The VR arm model may also include one or more joints. Each joint may allow one or more segment to move relative to one or more other segment. For example, a VR arm model representing a human may include a plurality of rigid and/or deformable body parts, wherein some segments may represent a corresponding anatomical body part of the human. In other words, each segment of the VR arm model may correspond to one or more structural elements (e.g., "bones"), with joints located at the intersection of adjacent bones. In some implementations, some of the structural elements may correspond to segments in the VR arm model and/or some of the structural elements may not correspond to segments in the VR arm model. In some implementations, the various joints may correspond to actual joints of a human.

As shown in FIG. 1, the VR arm model 10 includes segments 11, 13, 15, 17 and 19, and joints A, B, C, D, and E. Segment 11 is between joints A and B, segment 13 is between joints B and C, segment 15 is between joints C and D, segment 17 is between joints D and E, and segment 19 extends from joint E.

In some implementations, each of the joint A, B, C, D, and E, may be configured so that respective segments associated with the joints can rotate in a three-dimensional location in space. In other words, each joint can be configured with at most three degrees of freedom (3 DOF) (e.g., x, y, and z-axes), since many joints in the human body are defined through 1 or 2 degrees of freedom.

In accordance with the VR arm model 10 described herein, rotation about a subset of the joints are used to represent movement of the physical controller 112. Specifically, in the VR arm model 10, joints D and E can be used in determining a location of the physical controller 112 when viewed from within the HMD 8 as a virtual controller. In some implementations, the joints D and E may be the only joints used in determining the location of the physical controller 112 when viewed from within the HMD 8 as a virtual controller.

In this implementation, yaw, pitch, and roll of the physical controller 112 are interpreted as movements at the various joints of the arm model 10. If the physical controller 112 is aligned longitudinally along a first axis, the roll can be a rotation about the first axis. The yaw can be a rotation about a second axis orthogonal to first axis and through a top of the physical controller 112. The pitch can be a rotation about a third axis orthogonal to first axis and second axis, and through a side of the physical controller 112. In other words, 3 DOF movements (e.g., orientation movements) of the physical controller 112 are interpreted as (and displayed within the HMD) movements of a virtual controller about specific joints and/or segments of the VR arm model 10.

For example, a rotation of the physical controller 112 about the z-axis (e.g., yaw) can be represented, when viewed through the HMD 8, as movement, for example, left or right about the z-axis at the D joint. Accordingly, a virtual controller may be viewed within the HMD 8 as being at the end of segment 17 (and/or segment 19) and moving left or right.

Said differently, in some implementations, segment 17 may be configured to move about joint D. For example, segment 17 may move side-to-side (e.g., left-to-right) while one end of the segment 17 rotates about joint D. In other words, segment 17 may move around the z-axis (e.g., yaw). This may cause the virtual controller to correspondingly move in a similar manner in the VR environment. For example, when the segment 17 moves to at least left or right (along a lateral direction), the virtual controller when viewed within the VR environment of the HMD 8 also moves at least to the left or right. More details regarding this specific movement are described and shown in connection with FIG. 2A.

As another example, a rotation of the physical controller 112 about the y-axis (e.g., pitch) can be represented, when viewed through the HMD 8, as movement, for example, up or down of a virtual controller about the y-axis at the D joint. Accordingly, the virtual controller may be viewed within the HMD 8 as being at the end of segment 17 (and/or segment 19) and moving up or down.

Said differently, in some implementations, a first end (e.g., distal end) of segment 17 may be configured to move up or down while a second end (e.g., a proximal end) of the segment rotates about joint D. In other words, segment 17 may move around the y-axis (e.g., pitch). This may cause the controller 112 to correspondingly move in a similar manner in the VR environment. For example, when the segment 17 moves to at least up or down (along a vertical direction), the virtual controller when viewed within the VR environment of the HMD 8 also moves at least up or down. More details regarding this specific movement are described and shown in connection with FIG. 2B.

As yet another example, a rotation of the physical controller 112 about the x-axis (e.g., roll) can be represented, when viewed through the HMD 8, as rotation, for example, x-axis at the E joint. Accordingly, a virtual controller may be viewed within the HMD 8 as being at the end of segment 19 (and/or segment 17) and rotating around the length (or axis) of the virtual controller. In some implementations, the rotation of the physical controller 112 about the x-axis (e.g., roll) can be represented, when viewed through the HMD 8, as rotation, for example, x-axis (and segment 17) at the D joint.

Said differently, in some implementations, segment 19 may be configured to rotate about joint E. For example, segment 19 may rotate left-to-right while fixed about joint E. In other words, segment 17 may move around an x-axis (roll). In accordance with the implementations described herein, the rotation about joint E may be illustrated when viewed within the VR environment of the HMD 8 as rotating a hand to expose a palm of the hand and then rotating to expose a back of the hand. More details regarding this specific rotation are described and shown in connection with FIG. 2C.

In some implementations, the rotational movement about the x-axis may be concurrently rotated at joints D and E. In other words, some rotation may be attributable at joint D and some rotation may be attributable at joint E. For example, rotational movement may be 40% applied at about joint D and 60% applied at about joint E.

Although described as separate movements, any of the movements above can be combined. For example, any of the rotations (about the x, y, or z axes) of the physical controller 112 can be combined in any combination and then represented, using the VR arm model 10, as movement of a virtual controller when viewed from within the HMD 8 by a user.

In some implementations, the connected segments 15 and 17 represent an arm at a right angle. This configuration can be suited to emulate the user's natural movement. In other words, the natural movement of the user's arm correlates to how a user may hold and/or operate the physical controller 112.

In some implementations, segments 11, 13, 15, 17 and 19 may all be connected via joints B, C, D, and E. For example, segment 11 may be connected to segment 13 via joint B, segment 13 may be connected to segment 15 via joint C, segment 15 may be connected to segment 17 via joint D, and segment 17 may be connected to segment 19 via joint E. In some implementations, segment 17 may be aligned in an orthogonal direction with respect to segment 15, segment 15 may be aligned in an orthogonal direction with respect to segment 13, and segment 13 may be aligned in an orthogonal direction with respect to segment 11.

In some implementations, the connected segments 11, 13, 15, 17 and 19 may represent a corresponding anatomical body part of a user. In the implementations described herein, the connected segments 11, 13, 15, 17 and 19 may represent a right side of the user's body with an arm at a right angle. In some implementations, the right angle may be created when segment 15 is aligned in an orthogonal direction with respect to segment 17 via joint D.

In some implementations, segment 11 may represent a body part between a head of the user and a center above a thorax, segment 13 may represent a shoulder of the user, segment 15 may represent an upper arm of the user, segment 17 may represent a forearm of the user, and segment 19 may represent a hand of the user. It should be appreciated that the segments are merely illustrative representation of the body parts, and other parts of the body may be represented.

In some implementations, a size or length of segments 11, 13, 15, 17, and 19 may represent corresponding anatomical body parts of an average adult human. For example, segment 11 may be approximately 13-15 cm, segment 13 may be approximately 15-18 cm, segment 15 may be approximately 25-30 cm, segment 17 may be approximately 25-30 cm, and segment 19 may be approximately 17-20 cm. These dimensions are merely illustrative, and not to be exclusive.

In some implementations, segment 19 may represent a positon and/or movement of a virtual controller since at this location (e.g., position) the user is holding the physical controller. Segment 19 will emulate the movement and/or orientation of the virtual controller.

In some implementations, segments may be used to determine an initial location of the physical controller 112. In the implementations described herein, the initial location of the physical controller 112 may be determined by determining the location of joint D. Therefore, segments 11, 13, and 15 may be used to determine the initial location of the physical controller 112 by connecting segments 11, 13, and 15. For example, segment 11 (e.g., between joints A and B) may be connected to segment 13 (e.g., between joints B and C), and segment 13 may be connected to segment 15 (e.g., between joints C and D). In some implementations, an initial location may be determined as a pre-determined offset location or distance from the HMD 8.

In some implementations, a distance of movement of the segment 17 may correspondingly move the virtual controller in a same distance. In other implementations, a distance of movement of the segment 17 may not correspondingly move the virtual controller in a same distance, but instead, the system may approximate the distance.

In some implementations, other models besides the one described herein may also be used within the scope of this disclosure. For example, a model of a wireframe mesh, which may include hierarchies of rigid polygonal meshes, one or more deformable meshes, or any combination, may be used. In addition, a plurality of triangles may be used as a mesh that defines a shape of the user. Further, other models may include patches, non-uniform rational B-splines, subdivision surfaces, or other high-order surfaces.

In some implementations, a model may optionally include information pertaining to a current pose, one or more past poses, and/or model physics. Any model that can be posed and then simulated, is compatible with the herein described recognition, analysis, and tracking.

Figure 2A:
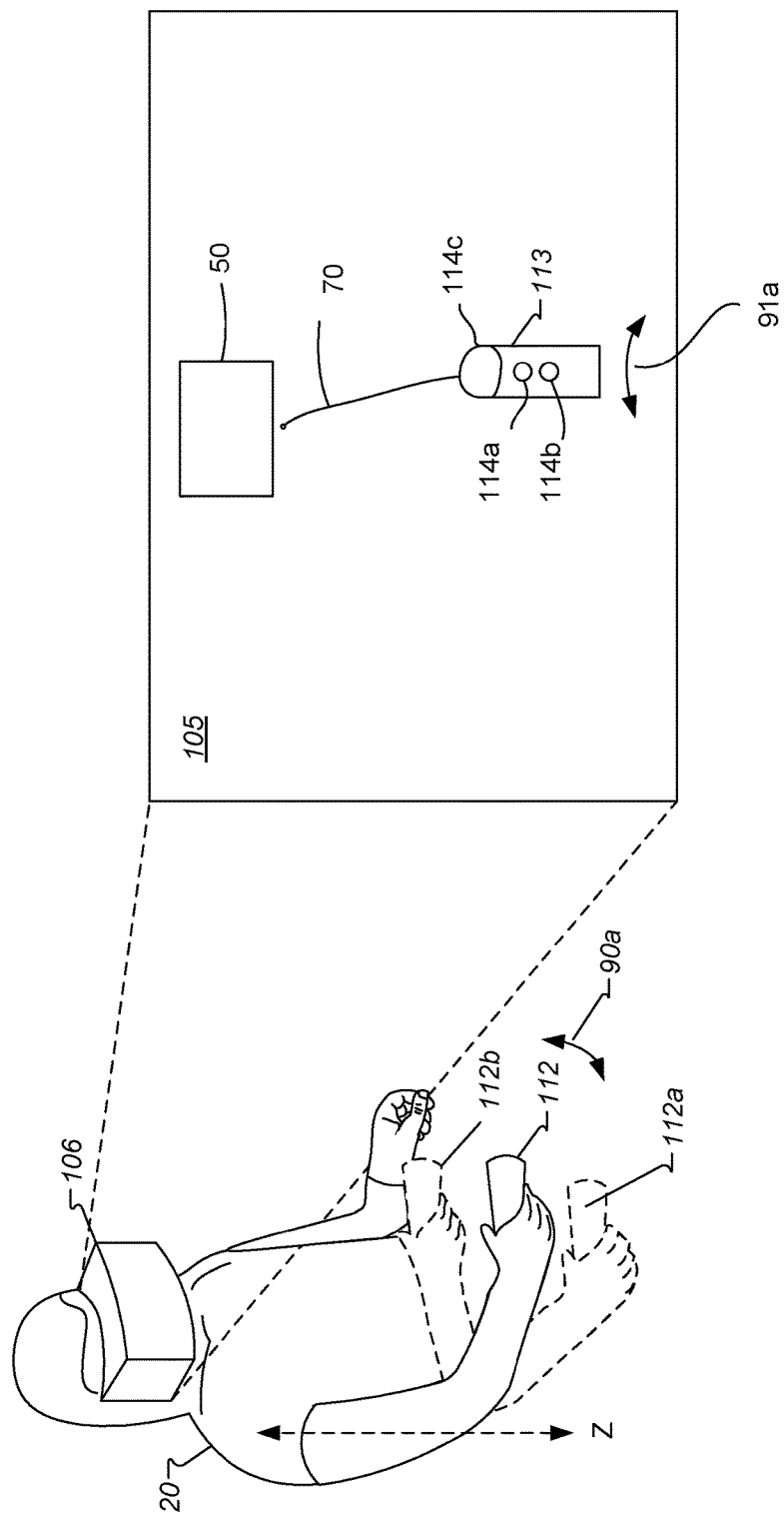
FIGS. 2A-2C illustrate a third person view of example implementations of a system of determining a location of a controller, in accordance with example embodiments.
Figure 2B:
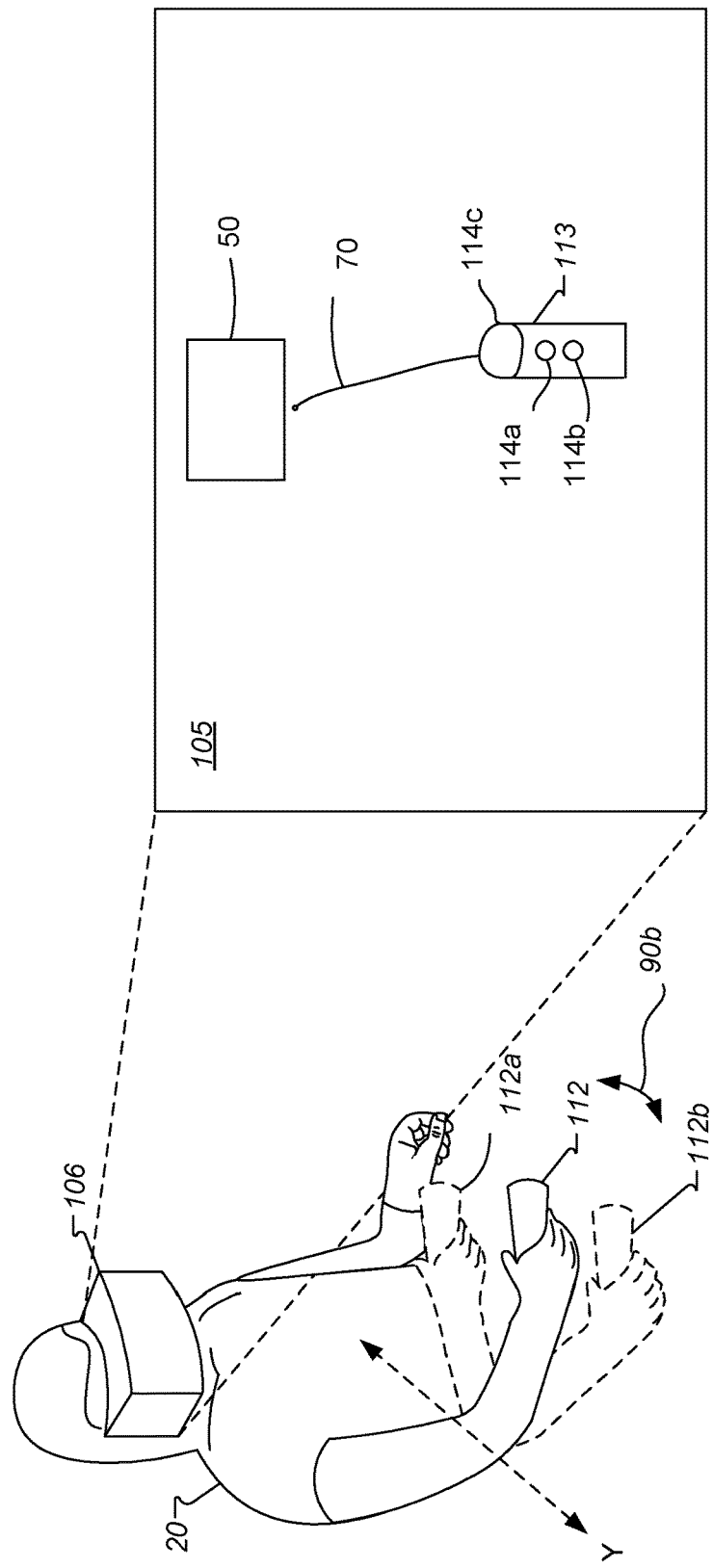
Figure 2C:
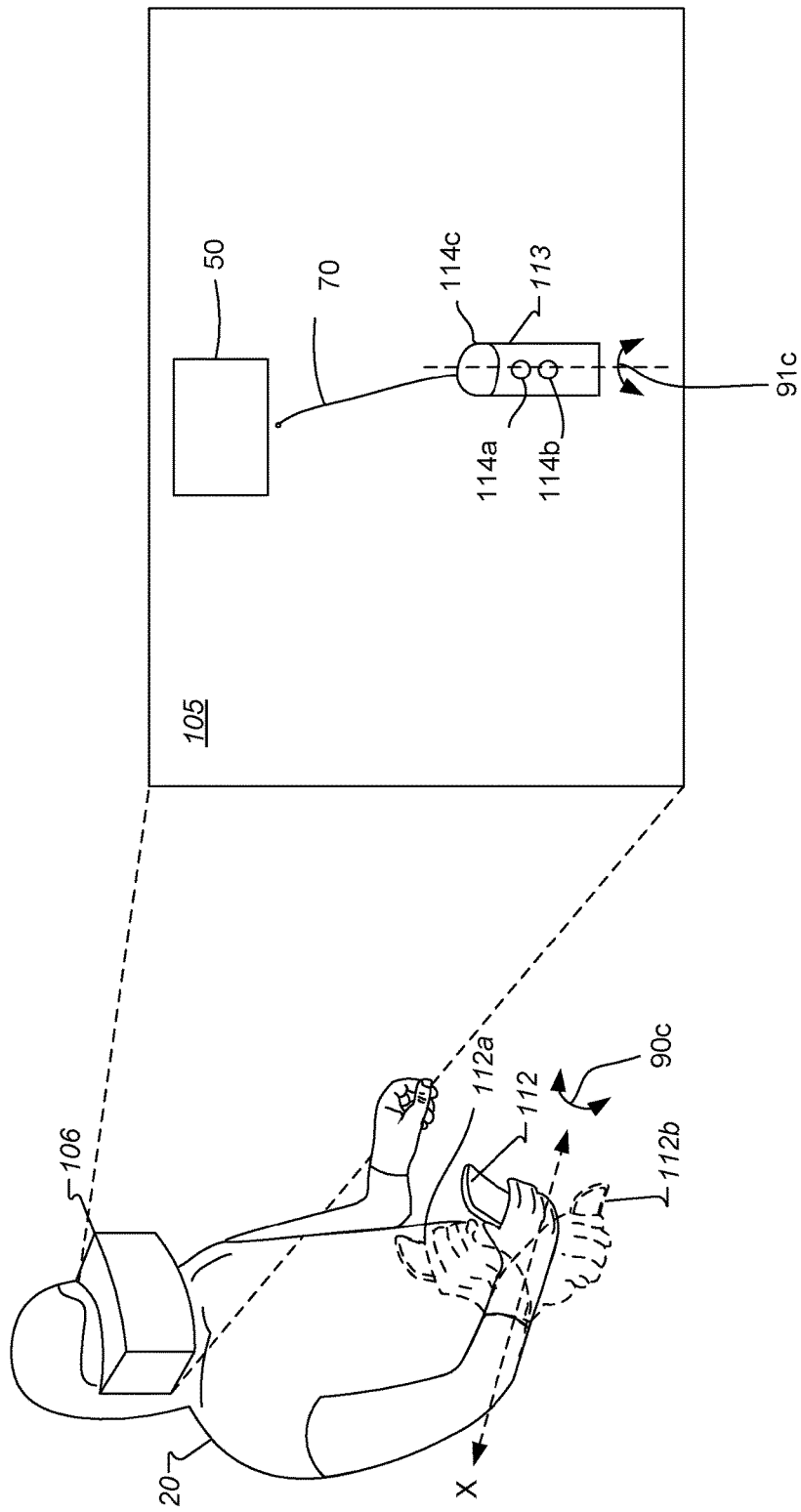

FIGS. 2A-2C illustrate a third person perspective view of a user 20 wearing a head mounted display (HMD) 106 through which a virtual reality environment 105 can be displayed to the user 20. An object 50 illustrated in FIGS. 2A-2C are objects seen by the user 20 within a VR environment 105 through the HMD 106, but are illustrated as seen by the third person view for ease of description. For example, the object 50 shown in FIGS. 2A-2C, is seen by the user 20 through the HMD 106, but in reality will not be seen by a third person. The other figures within this detailed description are similarly illustrated from a third person perspective for ease of description. In some implementations, the examples described within the detailed description can be applied to multiple objects and/or multiple users.

In accordance with the implementations described herein, a virtual controller 113 (e.g., a virtual representation of the controller) may also be displayed in the VR environment 105. The user 20 may use (e.g., employ) the virtual controller 113 to interact (e.g., grab, touch, contact, hold, etc.) with the object 50 in the VR environment 105. In order for the virtual controller 113 to interact with the object 50, a beam 70 (e.g., a pole, a stick, etc.) may be used to interact the object 50. In some implementations, the physical controller 112 may include several keys to operate (e.g., clicking, touching, swiping, etc.). For example, the physical controller 112 may include a home button 114a, a menu button 114b, and a touch pad 114c. In some implementations, the same keys (e.g., home button 114a, menu button 114b, and touch pad 114c) of the physical controller 112 may be shown in (e.g., represented within) the virtual controller 113.

In some implementations, the touch pad 114c may be used to activate/deactivate the beam 70. For example, if the user 20 interacts with object 50, the user 20 points generally to a direction of the object 50 and places an end of the beam 70 near or at the object 50 and presses the touch pad 114c to active (e.g., to grab the object 50) and then moves (or places) the object 50 at a desired location. In order to release the object 50, the user releases the touch pad 114c to release the object 50.

To accomplish an effective and relatively realistic presentation of movement of the virtual controller 113 in the VR environment 105, the present systems and methods use actual physical location of the physical controller 112 with respect to the HMD 106 and translate the movement into the VR environment 105. In accordance with the implementations described herein, the location of the virtual controller 113 may be determined by determining a location of a wrist joint (e.g., joint E). The wrist joint may correspond to the location of the hand and/or virtual controller 113. In some implementations, the location of the wrist joint may be determined by initially determining a location of the HMD 106, defining a location of an elbow joint (e.g., joint D) based on a predetermined distance from the location of the HMD 106, and defining a segment from the elbow joint to the wrist joint. Sensor(s) may be used to determine the location of each of the above locations, which will be described later.

As shown in FIG. 2A, the user 20 may move the arm at the elbow joint (e.g., joint D). In this implementation, the arm may move side-to-side (e.g., left-to-right, rotationally about axis z (which is into and out of the page)), as indicated by arrow 90a. In other words, the user's arm may rotate around z-axis (e.g., vertical axis). Hence, the movement of the user's arm and a rotation about the z-axis of the physical controller 112 causes the virtual controller 113 (via a VR arm model) to correspondingly move in a similar manner in the VR environment 105, as indicated by arrow 91a. For example, when the user's arm moves to the right, the physical controller 112a also moves to the right causing the virtual controller 113 to move right, and when the user's arm moves to the left, the physical controller 112b also moves to the left causing the virtual controller 113 to move left. In some implementations, the distance of movement of the user's arm may correspondingly move the virtual controller 113 per the VR arm model a corresponding distance.

In a non-limiting example, if the user interacts with a door so as to close the door, the user can operate the virtual controller 113 by pressing the touch pad 114a and moving the physical controller 112 to the left so that the virtual controller 113 moves in a similar manner. This operation will close the door in the VR environment.

As shown in FIG. 2B, the user 20 may move the arm at the elbow (e.g., joint D). In this implementation, the arm may move up or down, as indicated by arrow 90b. In other words, the user's arm may rotate around the y-axis. In the implementation described herein, the up movement may be illustrated as having a direction that is out of the page relative to view of FIG. 2B and the down movement may be described as having a direction that is into the page relative to view of FIG. 2B. In some implementations, the movement of the user's arm causes the virtual controller 113 (via a VR arm model) to correspondingly move in a similar manner in the VR environment 105. For example, when the user's arm moves up, the physical controller 112a also moves up causing the virtual controller 113 to move up, and when the user's arm moves down, the physical controller 112b also moves down causing the virtual controller 113 to move down. In some implementations, a movement distance of the user's arm may correspondingly move the virtual controller 113 per the VR arm model a corresponding distance.

In a non-limiting embodiment, if the user moves the physical controller 112 closer toward the HMD 106, the virtual controller 113 as seen in the VR environment may be brought closer to the user's view. In some implementations, the virtual controller 113 may have information regarding the controller itself. For example, the virtual controller 113 may include features relating to help, tool tips, battery life, battery usage, and/or other information.

In another non-limiting embodiment, if virtual objects placed on a conveyor belt are coming toward the user 20, the user 20 can then operate the controller 113 by moving the physical controller 112 downward toward the object, press the touch pad 114a to grab the object off the conveyor, and release the touch pad 114a to release the object at a desired location. In some implementations, the desired location may be at a same location as the location of the grabbed object. In some implementations, the desired location may be at a different location than at the location of the grabbed object.

As shown in FIG. 2C, the user 20 may move the arm at the wrist (e.g., joint E). In this implementation, the user's arm may rotate, as indicated by arrow 90c. In other words, the user's arm may rotate around the x-axis (e.g., longitudinal axis). In accordance with the implementations described herein, the left-and-right rotation about wrist joint may be illustrated as rotating a hand to expose a palm of the hand and then rotating to expose a back of the hand. The movement of the user's wrist causes the virtual controller 113 (via a VR arm model) to correspondingly move in a similar manner in the VR environment 105, as indicated by arrow 91c (which is a rotational or rotatable movement about the dashed line X). For example, when the user's wrist rotates to the right, the physical controller 112a rotates to the right causing the virtual controller 113 to rotate right, and when the user's wrist rotates to the left, the physical controller 112b rotates to the left causing the virtual controller 113 to rotate left. In some implementations, the distance of movement of the user's wrist may correspondingly move the virtual controller 113 per the VR arm model a corresponding distance.

In a non-limiting example, using the similar example of a door of above, if the user interacts with a door so as to turn a knob on the door, the user can operate the virtual controller 113 by pressing the touch pad 114a and rotating the physical controller 112 to the right so that the virtual controller 113 rotates in a similar manner. This operation will turn the knob of the door in the VR environment.

In some implementations, two or more movements of the user's arm and/or wrist may be combined. For example, the user's arm may move at least side-to-side (FIG. 2A) and at least up or down (FIG. 2B), in this order or vice versa. In another example, the user's arm may move at least side at least side-to-side (FIG. 2A) and at least rotate left-to-right (FIG. 2C), in this order or vice versa. In yet another example, the user's arm may move at least side at least up or down (FIG. 2B) and at least rotate left-to-right (FIG. 2C), in this order or vice versa.

In some implementations, three or more movements of the user's arm and/or wrist may be combined. For example, the user's arm may move at least side-to-side (FIG. 2A), at least up or down (FIG. 2B), and at least rotate left-to-right (FIG. 2C), in this order or any combination of order.

Figure 3:
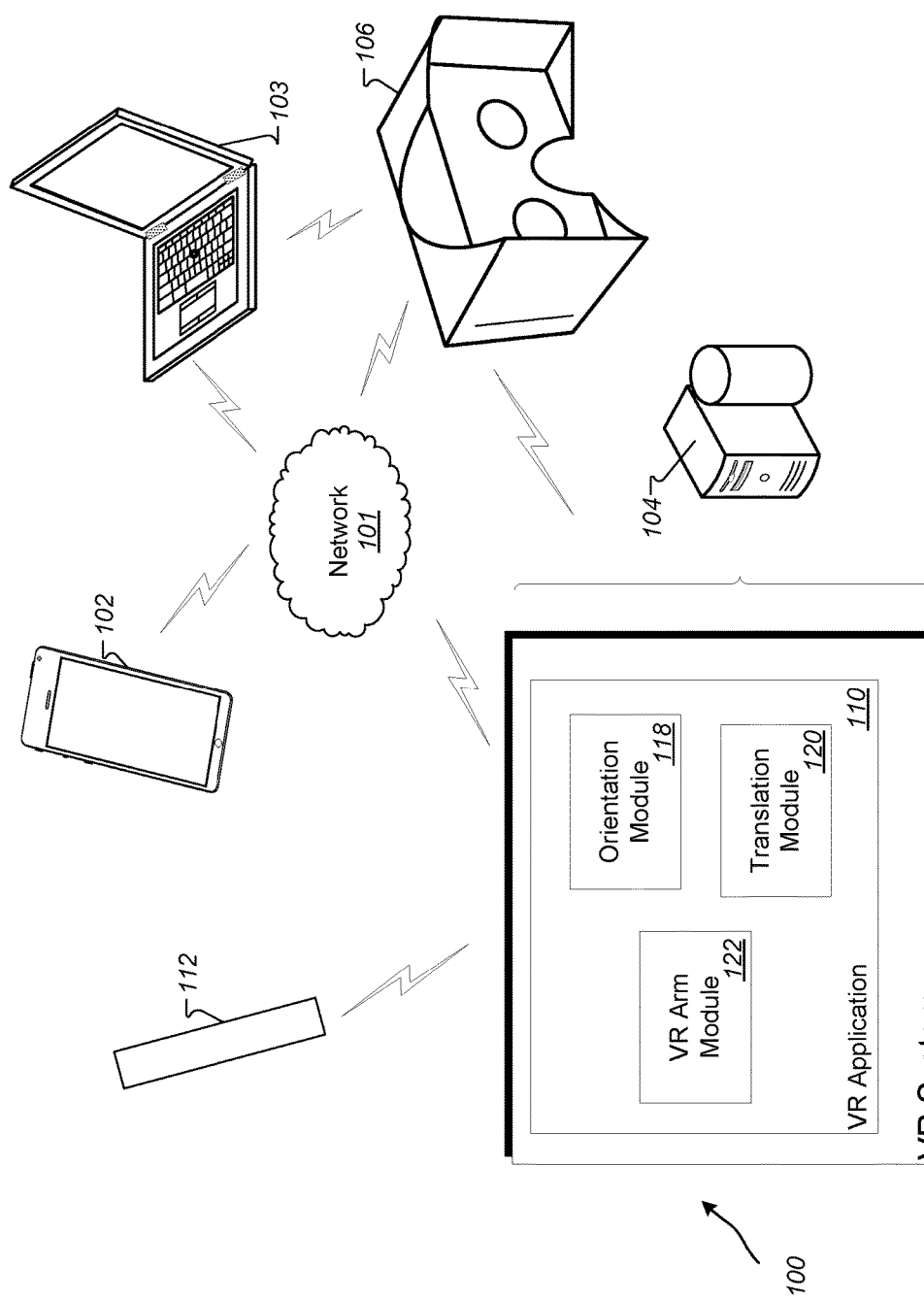
FIG. 3 is a diagram of an example VR system that may be used to determine a location of a controller in VR environments in accordance with example embodiments.

FIG. 3 illustrates a diagram of an example virtual reality (VR) system 100 for creating and interacting with a three-dimensional (3D) VR environment 105 in accordance with the teachings of this disclosure is shown. In general, the system 100 may provide the VR environment 105, and VR content that enable a person (e.g., a user, a wearer, etc.) to access, view, use and/or interact with the VR environment 105. The VR system 100 can provide the user with options for accessing the content, applications, virtual objects, real objects, and VR controls. The example VR system 100 of FIGS. 2A-2C may include the user 20 wearing the HMD 106, and having the handheld physical controller 112. The example VR environment 105 shown in FIGS. 2A-2C is a representation of the images being displayed for the user 20 inside their HMD 106.

As shown in FIG. 3, the VR application 110 may include an orientation module 118, a translation module 120, and a VR arm module 122. The VR application, or portions thereof, can be included in the physical controller 112, the HMD 106 and/or the VR system 108.

The orientation module 118 may access, for example, one or more inertial measurement units (IMUs), light sensors, audio sensors, image sensors, distance/proximity sensors, locational sensors and/or other sensors to determine an orientation of the physical controller 112 in the real world, or physical environment relative to the virtual environment. In some implementations, the orientation module 118 may be incorporated in the physical controller 112. In some implementation, the orientation module 118 may be configured to, via the sensor(s), determine an orientation of the physical controller 112. In other implementations, the orientation module 118 may access, for example, one or more inertial measurement units, light sensors, audio sensors, image sensors, distance/proximity sensors, locational sensors and/or other sensors to track a physical location of the HMD 106 in the real world, or physical environment relative to the virtual environment. In some implementations, the orientation module 118 may be incorporated in the HMD 106. In some implementation, the orientation module 118 may be configured to, via the sensor(s), determine the location of the HMD 106.

In some implementations, the orientation module 118 may be included in the physical controller 112 and/or the HMD 106. In some implementations, operations of the orientation module 118 may be executable in the physical controller 112 and/or the HMD 106.

The orientation module 118 may access any number of memory storage and/or sensors described herein to determine particular orientations of the physical controller 112, users, virtual objects, and areas associated with moving objects within the VR environment 105. For example, the orientation module 118 may determine the orientation (e.g., yaw, pitch, and/or roll) of the physical controller 112.

Once the orientation module 118 determines the orientation of the physical controller 112, the translation module 120 may translate the movement of the physical controller 112 into the VR environment 105. In some implementations, the translation module 120 may translate movements of the physical controller 112 based on the following movements: a) side-to-side movements (e.g., yaw), b) up or down movement (e.g., pitch), and/or c) left-to-right rotation (e.g., roll).

The VR arm module 122 may produce the virtual arm model. In some implementations, the translation module 120 may use the arm model produced by the arm module 122 and use the information from the orientation module 118 and the arm module 122 to produce a virtual location and/or orientation of the virtual controller.

In some implementations, the orientation module 118 and/or the translation module 120 can allow the physical controller 112 to interact with virtual objects. The controller interaction can be interpreted as a physical gesture (e.g., movement) to be carried out on the virtual objects. For example, the user can then operate the virtual controller to point or touch an object. Such movements can be performed and depicted with 3 DOF movements.

The example VR system 108 may include any number of computing and/or electronic devices that can exchange data over a network 101. The devices may represent clients or servers, and can communicate via the network 101 or any other additional and/or alternative network(s). Example client devices include, but are not limited to, the HMD 106, the physical controller 112, a mobile device 102 (e.g., a smartphone, a personal digital assistant, a portable media player, etc.), a laptop or netbook 103, a desktop computer 104, an electronic tablet (not shown), a camera (not shown), a gaming device (not shown), and any other electronic or computing devices that can communicate using the network 101 or other network(s) with other computing or electronic devices or systems, or that may be used to access VR content or operate within a VR environment. The devices 102-104, 106, and 112 may represent client or server devices. The devices 102-104, 106, and 112 can execute a client operating system, and one or more client applications that can access, render, provide, or display VR content on a display device included in or in conjunction with each respective device 102-104, 106, and 112.

The VR system 108 may represent a server device. In general, VR system 108 may include any number of repositories storing content and/or virtual reality software modules that can generate, modify, or execute virtual reality scenes. In the depicted example, VR system 108 includes a VR application 110 that can access and present content and/or controls for system 108. In some implementations, VR application 110 can run locally on one or more of devices 102-104. The VR application 110 can be configured to execute on any or all of devices 102-104 and be controlled or operated upon using the physical controller 112, for example.

Particular implementations described in this disclosure may enable a user to use the physical controller 112 to interact with the VR environment. For example, the user can hold the physical controller 112 to select and manipulate virtual objects in 3D in the VR environment. An example physical controller 112 may include a housing in which internal components of the controller device are received, and a user interface (not shown) on an outside of the housing, accessible to the user. The user interface may include a plurality of different types of manipulation devices (not shown in detail in FIGS. 2A-2C) including, for example, touch sensitive surface(s) configured to receive user touch inputs, buttons, knobs, joysticks, toggles, slides and other such manipulation devices.

One or more sensors can be included on the physical controller 112. The sensors can be triggered to provide input to the VR environment, for example, by users accessing the physical controller 112 and HMD device 106. The sensors can include, but are not limited to, a touchscreen sensors, accelerometers, gyroscopes, pressure sensors, biometric sensors, temperature sensors, humidity sensors, and ambient light sensors. The physical controller 112 can use the sensors to determine a detected rotation of physical controller 112 in the VR environment. The rotations can then be used as input to the VR environment. In one non-limiting example, the physical controller 112 may be incorporated into the VR environment as a stick, a pencil or pen, a drawing tool, a controller, a remote, a laser pointer, a mobile phone, a paintbrush or other object etc. Positioning of the physical controller 112 by the user when incorporated into (or represented within) the VR environment can allow the user to position particular virtual objects as well as to position stick, paintbrush, pencil or pen, drawing tool, controller, remote, laser pointer, mobile phone, a paintbrush or other object in the VR environment. Such positioning can be used, in some implementations, as a trigger for manipulating objects using anchor points.

The HMD device 106 may represent a virtual reality headset, glasses, eyepiece, or other wearable device capable of displaying virtual reality content. In operation, the HMD device 106 can execute a VR application, which can playback received and/or processed images to a user through a display (not shown) in the HMD device 106. In some implementations, the VR application 110 can be hosted by one or more of the devices 102-104, and 106.

In some implementations, the example HMD device 106 may include a housing coupled to a frame, with an audio output device including, for example, speakers mounted in headphones. In the example HMD device 106, a display (not shown) may be mounted on an interior facing side of the front portion of the housing. Lenses may be mounted in the housing, between the user's eyes and the display. In some implementations, the HMD device 106 may include a sensing system including various sensors such as, for example, audio sensor(s), image/light sensor(s), locational sensors (e.g., inertial measurement unit including gyroscope and accelerometer), and the like. The HMD device 106 may also include a control system including processors and various control system devices to facilitate operation of the HMD device 106.

In some implementations, the HMD device 106 may include one or more cameras (not shown) to capture still and moving images. The images captured by such cameras may be used to help track a physical location of the user and/or the physical controller 112 in the real world, or physical environment relative to the VR environment, and/or may be displayed to the user on the display in a pass through mode, allowing the user to temporarily leave the virtual environment and return to the physical environment without removing the HMD device 106 or otherwise changing the configuration of the HMD device 106.

In some implementations, the mobile device 102 can be placed and/or located within the HMD device 106. The mobile device 102 can include a display device that can be used as the screen for the HMD device 106. The mobile device 102 can include hardware and/or software for executing the VR application 110. In some implementations, HMD device 106 can provide full tracking of location and user movements within six degrees of freedom. The tracking can be based on user hand movements, head movements, eye movements, or tracking of controllers moving based on user input.

Additional devices are possible and such devices may be configured to be substituted for one another. In some implementations, the devices 102-104 can be laptop or desktop computers, smartphones, personal digital assistants, portable media players, tablet computers, gaming devices, or other appropriate computing devices that can communicate, using the network 101, with other computing devices or computer systems.

In the example system 100, the HMD device 106 can be connected to device 102 or device 104 to access VR content on VR system 108, for example. Device 102 or 104 can be connected (wired or wirelessly) to HMD device 106, which can provide VR content for display.

In some implementations, one or more content servers (e.g., VR system 108) and one or more computer-readable storage devices can communicate with the computing devices 102-104, 106 using network 101 to provide VR content to the devices 102-104 and 106. In some implementations, the network 101 can be a public communications network (e.g., the Internet, cellular data network, dialup modems over a telephone network) or a private communications network (e.g., private LAN, leased lines). In some implementations, the computing devices 102-108 can communicate with the network 101 using one or more high-speed wired and/or wireless communications protocols (e.g., 802.11 variations, Wi-Fi, Bluetooth, Transmission Control Protocol/Internet Protocol (TCP/IP), Ethernet, IEEE 802.3, etc.).

In some implementations, the mobile device 102 can execute the VR application 110 and provide the content for the VR environment. In some implementations, the laptop computing device can execute the VR application 110 and can provide content from one or more content servers (e.g., VR system 108). The one or more content servers and one or more computer-readable storage devices can communicate with the mobile device 102 laptop computing device 104, and/or physical controller 112, using the network 101 to provide content for display in HMD device 106.

Figure 4:
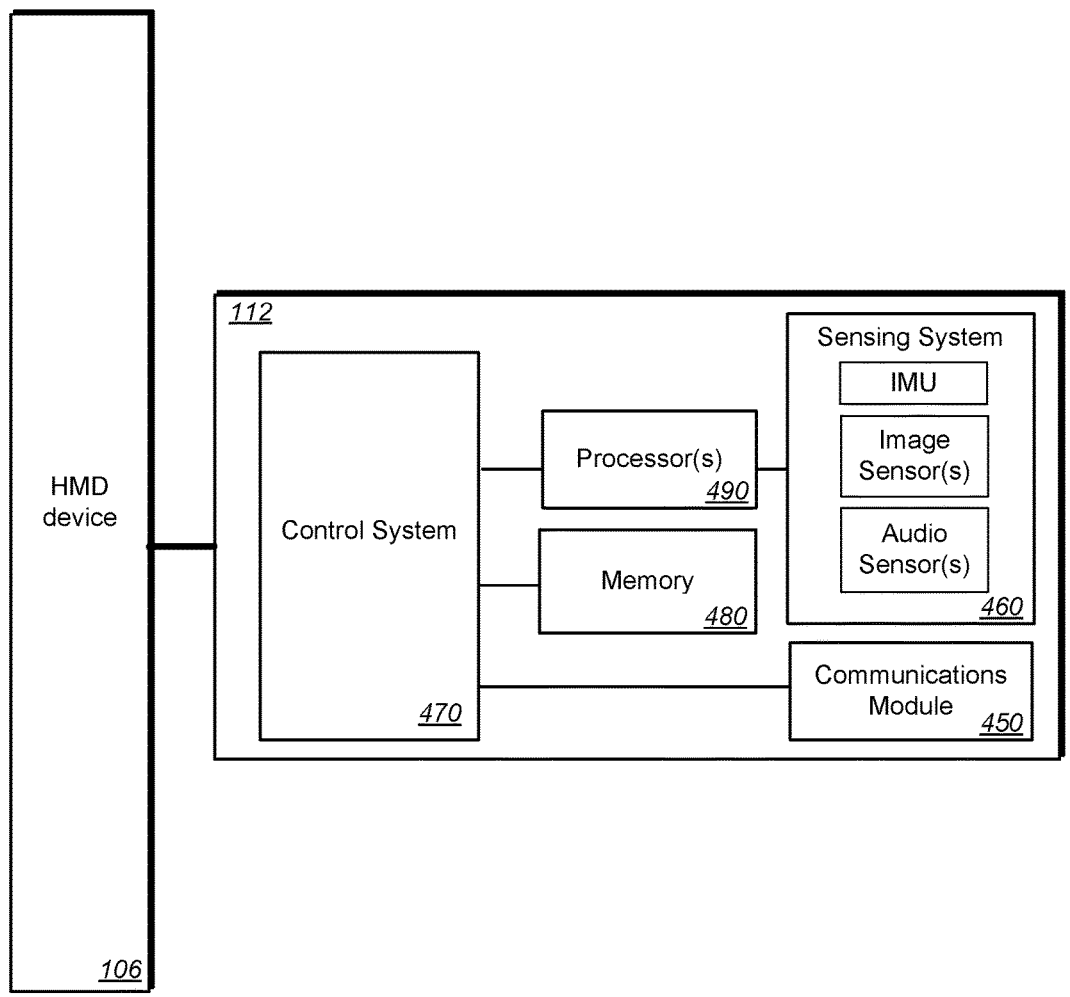
FIG. 4 is a block diagram depicting a controller communicably coupled to an HMD device in a VR space.

FIG. 4 is a block diagram depicting a physical controller 112 communicably coupled to an HMD device 106 in a VR environment. In operation, system 100 can be configured to provide a VR environment housing any number of virtual objects that can be manipulated with the devices shown in FIG. 3. The physical controller 112 may interface with the HMD device 106 to generate an immersive virtual environment. The physical controller 112 may be paired with the HMD device 106, for example, to establish communication between the devices and to facilitate user interaction with the immersive VR environment. In some implementations, the physical controller 112 may be paired to the HMD device 106, but may be instead tracked by the tracking module 116 in VR application 110 or another external tracking device.

Referring to FIG. 4, the physical controller 112 includes a sensing system 460 and a control system 470. The sensing system 460 may include one or more different types of sensors, including, for example, a light sensor, an audio sensor, an image sensor, a distance/proximity sensor, a locational sensor (e.g., an inertial measurement unit (IMU) including a gyroscope and accelerometer) and/or other sensors and/or different combination(s) of sensors, including, for example, an image sensor positioned to detect and track eye gaze associated with a user. The control system 470 may include, for example, a power/pause control device, audio and video control devices, an optical control device, a transition control device, and/or other such devices and/or different combination(s) of devices. The sensing system 460 and/or the control system 470 may include more, or fewer, devices, depending on a particular implementation.

The physical controller 112 may also include at least one processor 490 in communication with the sensing system 460 and the control system 470, a memory 480, and a communication module 450 providing for communication between the physical controller 112 and another, external device, such as, for example, subsequent controller(s) and/or HMD device(s).

In general, the systems and methods described in this disclosure can track user hand or the physical controller 112 and analyze user movement associated with such hand and/or controller in the VR environment to determine the intent of such movement.

Figure 5:
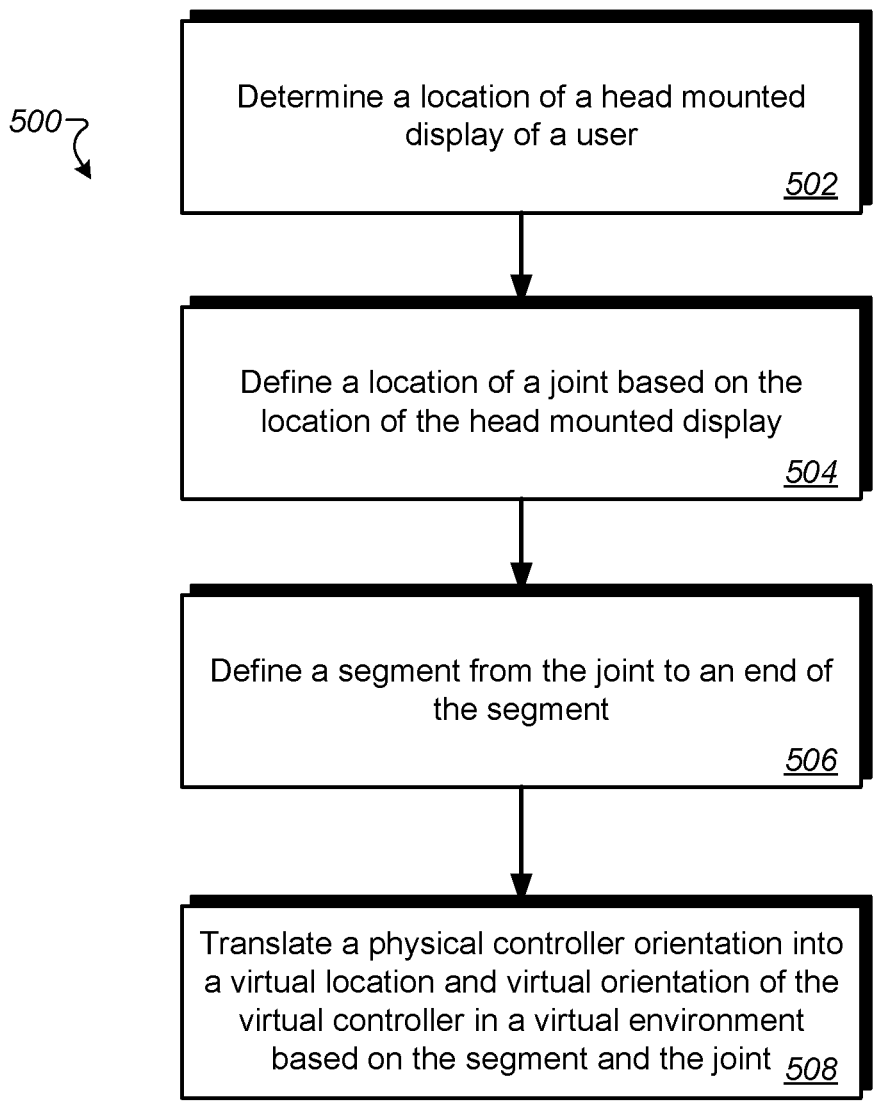
FIGS. 5 and 6 are flow diagrams related to determining a location of a controller in VR environments in accordance to example embodiments.

FIG. 5 illustrates an example method 500 that may be performed to determine a location of a virtual controller within a VR environment as disclosed herein. The example method 500 of FIG. 5 begins with determining a location of a HMD of a user (block 502), defining a location of a joint based on the location of the HMD (block 504), define a segment from the joint to an end of the segment (block 506), and translating a physical controller orientation into a virtual location and virtual orientation of the virtual controller in a VR environment based on the segment and the joint (block 508).

At block 502, the location of the HMD of the user may be determined at a center of the user's head. In accordance with the implementations described herein, the user holding the controller should be looking straight ahead and an arm at a right angle.

At block 504, the location of the first joint may be defined based on the location of the HMD, determined at block 502.

At block 506, a segment from the joint (e.g., joint D) to an end of the segment is defined. In some implementations, the end of the segment may correspond to a joint (e.g., joint E). In accordance with the implementations described herein, this segment may represent a forearm of the user. The segment may move around about joint D. In some implementations, the segment may move about the joint (e.g., joint D) in at least a side-to-side direction (e.g., left-to-right). In other implementations, the segment may move about the joint (e.g., joint D) in at least up or down direction.

At block 508, the physical controller location and orientation may be translated into the virtual controller location and orientation in the VR environment based on the segment and the joint. The virtual controller may correspondingly move in a similar manner as the physical controller.

The example method 500 of FIG. 5, or other methods disclosed herein, may be implemented as machine-readable instructions carried out by one or more processors to control or operate the example display assemblies disclosed herein. A processor, a controller and/or any other suitable processing device may be used, configured and/or programmed to execute and/or carry out the example methods disclosed herein. For instance, the example method 500 of FIG. 5, or other methods disclosed herein may be embodied in program code and/or machine-readable instructions stored on a tangible and/or non-transitory computer-readable medium accessible by a processor, a computer and/or other machine having a processor, such as that discussed below in connection with FIG. 3. Machine-readable instructions can include, for example, instructions that cause a processor, a computer and/or a machine having a processor to perform one or more particular processes. Many other methods of implementing the example method 500 of FIG. 5, or other methods disclosed herein may be employed. For example, the order of execution may be changed, and/or one or more of the blocks and/or interactions described may be changed, eliminated, sub-divided, or combined. Additionally, any of the entire example method 500 of FIG. 5, or other methods disclosed herein may be carried out sequentially and/or carried out in parallel by, for example, separate processing threads, processors, devices, discrete logic, circuits, etc.

Figure 6:
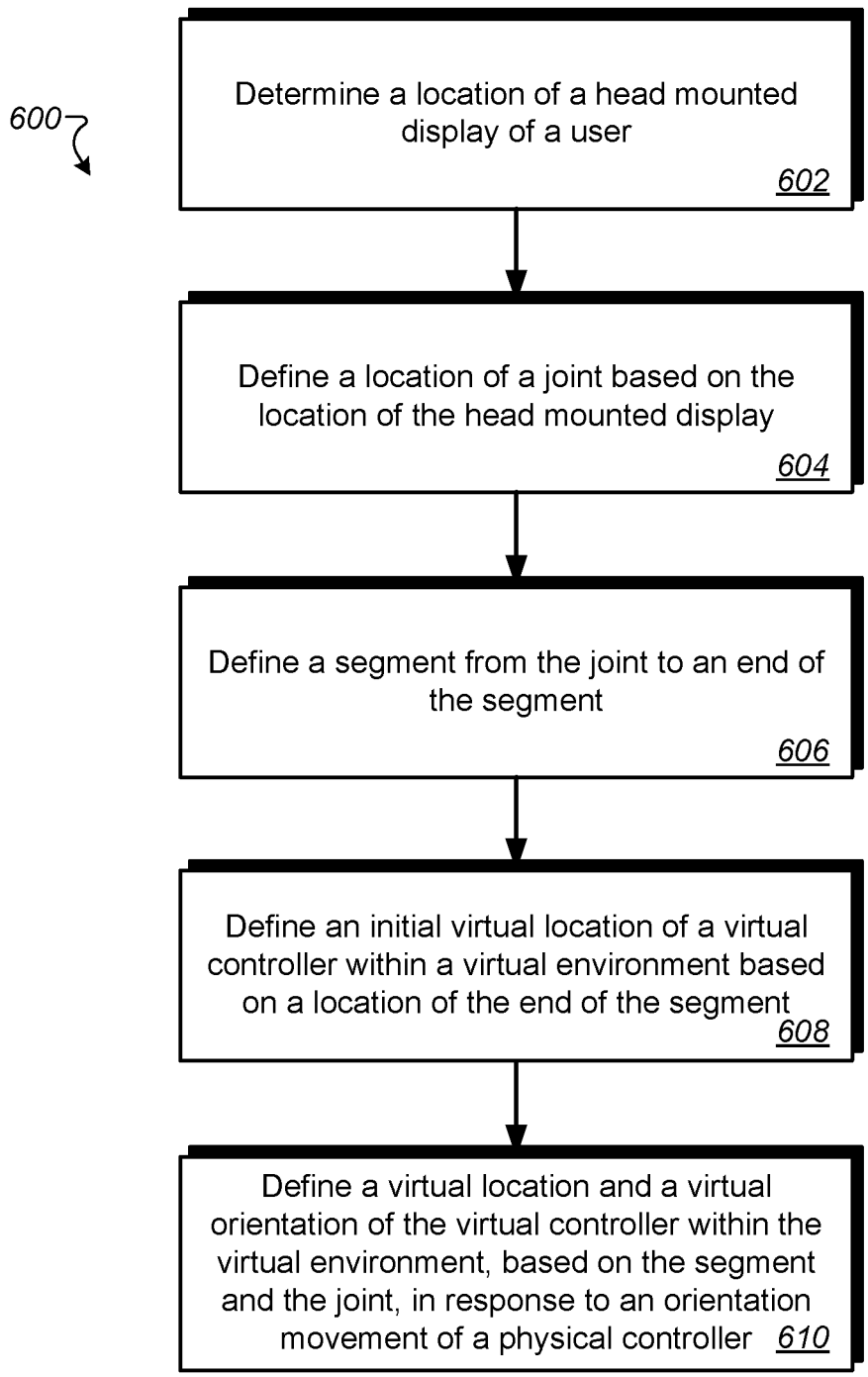

FIG. 6 illustrates another example method 600 that may be performed to determine a location of a virtual controller within a VR environment as disclosed herein. The example method 500 of FIG. 6 begins with determining a location of a HMD of a user (block 602), defining a location of a joint based on the location of the HMD (block 604), define a segment from the joint to an end of the segment (block 606), defining an initial virtual location of a virtual controller within a virtual environment based on a location of the end of the segment (block 608), and defining a virtual location and a virtual orientation of the virtual controller within the virtual environment, based on the segment and the joint, in response to an orientation movement of a physical controller (block 610).

Figure 7A:
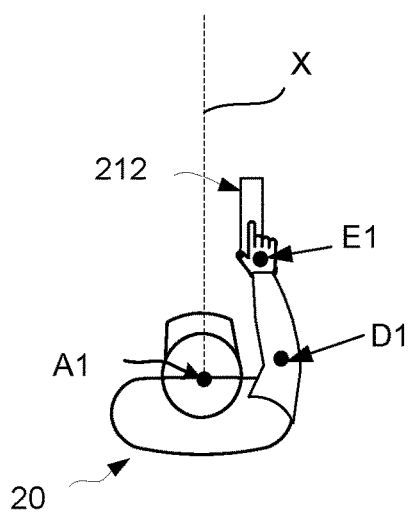
FIGS. 7A and 7B are schematic diagrams of a user when a user moves in relation to a joint, in accordance with an example embodiment.
Figure 7B:
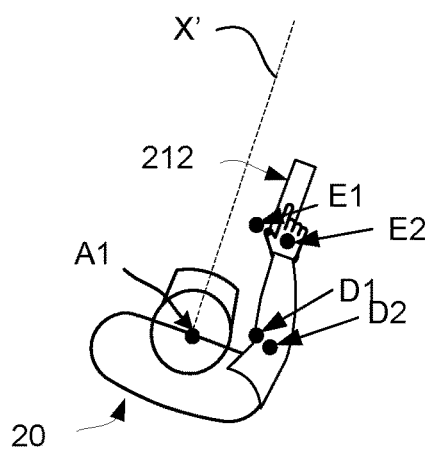

FIGS. 7A and 7B are schematic diagrams of a user, as viewed by a third person above, when a user moves in relation to a joint, in accordance with an example embodiment. FIG. 7A illustrates the user 20 in a first location associated with the first joint Dl. FIG. 7B illustrates the user 20 in a second location associated with the first joint D2 at a different location.

In some implementations, as previously discussed above, the location of the joint D1 may be determined by measuring a distance from a portion (e.g., center) of the user's head Al (or HMD) down to joint D1 (e.g., elbow joint). For example, as discussed previously, the location of joint D1 may be determined by the segments (e.g., segments 11, 13, and 15) to obtain the location of the joint Dl.

As shown in FIG. 7A, the user 20 is looking forward, as defined by line X, and the controller 212 is also in a forward location (e.g., parallel to line X). This may be defined as the first location. In some implementations, the first location may include the user's 20 arm being at a right angle, e.g., a first segment (e.g., segment 15) being orthogonal to a second segment (e.g., segment 17), as seen from a side view. At an end of the user's arm is joint E1. The location of joint E1 may be used to determine the location of the controller 212.

In some implementations, the first location of the user 20 may also include determining a location of a shoulder joint (e.g., joint C). In some implementations, the shoulder joint may help align the user in the first location. In the implementations described herein, the shoulder joint and joint D1 appear to be at the same location, when viewed from a top view, because segment 15, which may be defined between shoulder joint and joint D1, is at a right angle with segment 17.

In a non-limiting example, while the user 20 is in the first location (e.g., looking straight ahead), based on at least a location of the shoulder joint, the user 20 may bring the controller 212 closer to the user's face, which then causes the virtual controller in the VR environment to move in a similar manner (e.g., closer to the user's face in the VR environment). While keeping the shoulder straight (or joint D1 still), the user 20 may then turn his head left or right without the virtual controller having been moved (e.g., still in front of the user's face) in the VR environment. Because the shoulder (or joint D1) remained static (e.g., still, stationary, fixed, etc.), the virtual controller remained static as well even though the user 20 turned his head. Hence, no further calibration of controller was required.

In some implementations, the angular velocity of the user and/or the physical controller may determine movement of the virtual controller. In the implementations described herein, angular velocity may measure a rate of change of its angular displacement with respect to time. In other words, how fast the user and/or the physical controller move with respect to time. If the movement satisfies (e.g., meets) a certain threshold (e.g., condition) of angular velocity, the virtual controller may move. For example, using the similar example of above, while the positon of the shoulder remains static, the user 20 turns his head relatively quickly to the left or right, the systems and methods may determine that the virtual controller is to be maintained at its location and orientation as certain angular velocity threshold (or condition) has been met.

In another non-limiting example, if, on the other hand, the user turns his head in a relatively slow manner (and not satisfies an angular velocity condition), the system and methods may determine that the user's location may be changed, and thus, moving the location of the virtual controller.

In another non-limiting example, if the user moves the physical controller relatively quickly (e.g., up and down) (and satisfies an angular velocity condition), the systems and methods may determine that the virtual controller is to be maintained at its location and orientation as certain angular velocity threshold (or condition) has been met.

In another non-limiting example, if, on the other hand, the user moves the physical controller relatively slowly (e.g., up and down) (and satisfies an angular velocity condition), the system and methods may determine that the location of the virtual controller may be changed according to the user's movement.

In some implementations, both the user and the physical controller angular velocity may be used to determine whether to move the virtual controller. For example, if the user's head and the physical controller are simultaneously moving relatively quickly to satisfy the threshold (or condition), the systems and methods may determine to move the virtual controller to its desired location.

As shown in FIG. 7B, when the user 20 moves locations (e.g., turns body approximately to the right) at joint A1, the joint D1 associated with the first location also moves such that the joint (e.g., now at D2) moves in a similar distance and/or orientation. Consequently, this may cause a location of joint E1 to move in a similar distance and/or orientation (e.g., now at E2). The location of the joint D1 (and joint E1) is dynamic, which means that the joint D1 (and joint E1) moves when the location of the user 20 changes. As illustrated in this exemplary implementation, the user 20 may have rotated approximately, for example, 30 degrees associated with the shoulder, for example. In some other implementations, the user may rotate between 0 and 360 degrees associated with the shoulder, for example.

In some implementations, the HMD 106 and/or the physical controller 112 may be re-calibrated (e.g., re-centered). In accordance with the implementations described herein, re-calibration is setting the location of the user 20 and the physical controller 112 to be in a forward and/or forward-looking location. In some implementations, the re-calibration may be based on a predetermined location of the HMD 106 in relation to the physical controller 112. More specifically, the location of the user's location in relation to the location of the second joint (e.g., E1).

In some implementations, in order to re-calibrate the HMD 106 and/or the physical controller 112, the user 20 may operate a key on the physical controller 112 to reset the location and/or orientation of the HMD 106 and/or physical controller 112. For example, the user 20 may press the home button 114a of the physical controller 112 to reset the location and/or orientation of the physical controller 112.

The systems and methods according to the implementations described herein may re-calibrate the movement measured in only the z-axis (e.g., upward axis), as shown in FIG. 1. The movements measured in the x-axis (e.g., side-to-side axis), as shown in FIG. 1 and the x-axis (e.g., front-to-back axis), as shown in FIG. 1 should generally not be re-calibrated because these movements do not move laterally (e.g., side-to-side) on a same plane.

Figure 8:
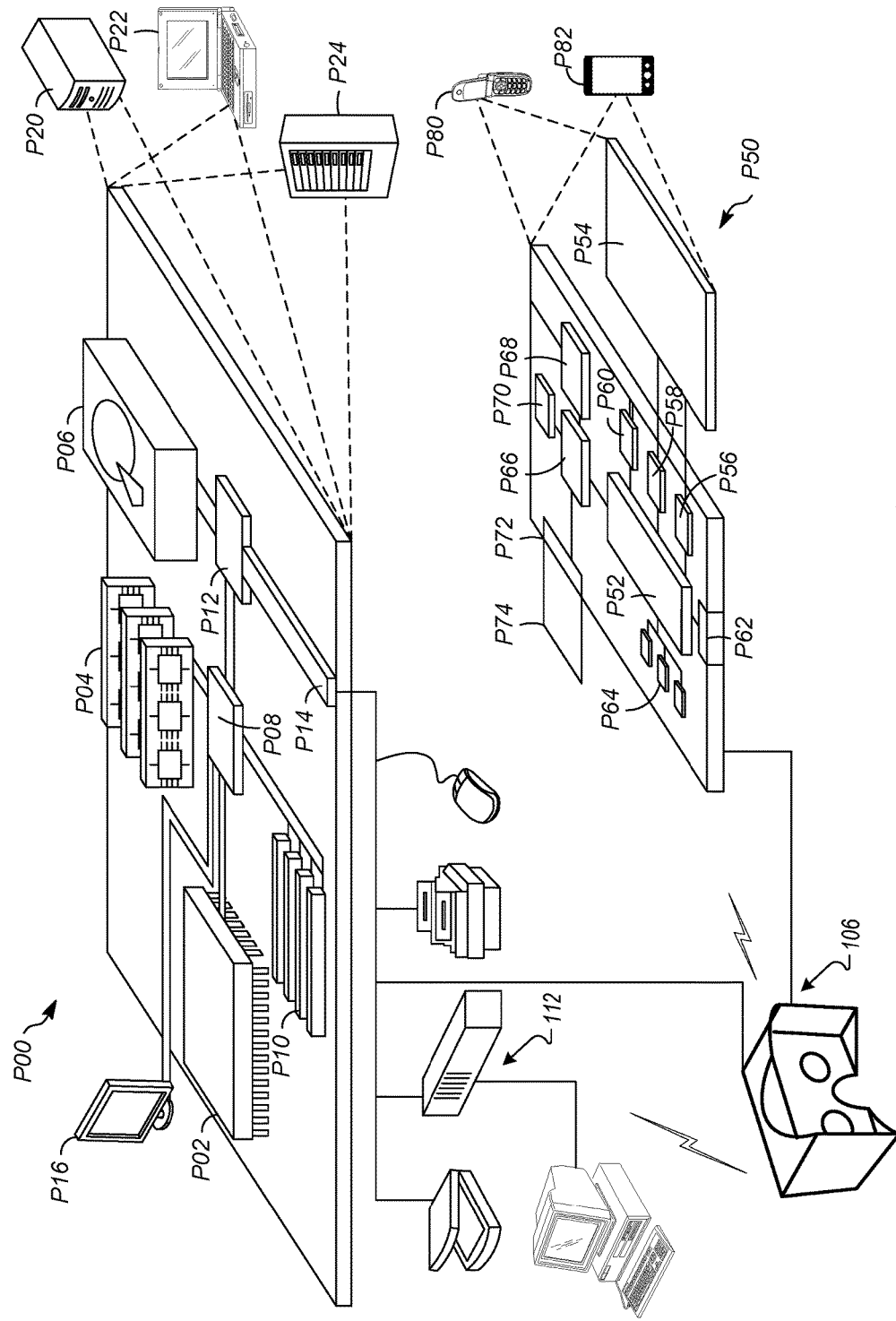
FIG. 8 is a block schematic diagram of an example computer device and an example mobile computer device that may be used to implement the examples disclosed herein.

Referring to FIG. 8, an example of a generic computer device P00 and a generic mobile computer device P50, which may be used with the techniques described here. The computing devices P50 may be used to implement any of the devices disclosed herein including, but not limited to, HMD 106, physical controller 112, devices 102-108, and controller 110. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, connections, memories, caches, etc. and may be mounted on a common motherboard or in other manners as appropriate. The processor P02 can process instructions for execution within the computing device P00, including instructions stored in the memory P04 or on the storage device P06 to light-emitting portion graphical information for a GUI on an external input/output device, such as light-emitting portion P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, light-emitting portion P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, Wi-Fi) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a light-emitting portion P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and light-emitting portion interface P56 coupled to a light-emitting portion P54. The light-emitting portion P54 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface P56 may comprise appropriate circuitry for driving the light-emitting portion P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single Inline Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory P64, expansion memory P74, or memory on processor P5 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, left, right, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
   determining a location of a head mounted display (HMD) of a user;
   defining a location of a first joint based on a predetermined distance from the location of the HMD;
   defining a first segment from the first joint;
   defining a second segment extending from a second joint at an end of the first segment
   defining a location of a virtual controller in a virtual environment based on an end of the second segment; and
   translating a physical controller orientation into a virtual location and virtual orientation of the virtual controller in the virtual environment based on at least one of the first segment, the second segment, the first joint, and the second joint.

2. The method of claim 1, wherein the virtual controller is configured to move along a lateral direction in response to a yaw movement of the physical controller.

3. The method of claim 1, wherein the virtual controller is configured to move along a vertical direction in response to a pitch movement of the physical controller.

4. The method of claim 1, wherein the virtual controller is configured to rotate about an axis along which the physical controller is longitudinally aligned in response to a roll movement of the physical controller.

5. The method of claim 1, wherein the second segment is configured to rotate about the second joint.

6. The method of claim 1, further comprising re-defining the location of the first joint if a location of the user is detected.

7. A method comprising:
   determining a location of a head mounted display (HMD) of a user;
   defining a location of a joint based on the location of the HMD;
   defining a first segment connected to a second segment via the joint;

defining an initial virtual location of a virtual controller within a virtual environment based on a location of an end of the second segment; and defining a virtual location and a virtual orientation of the virtual controller within the virtual environment, based on the second segment and the joint, in response to an orientation movement of a physical controller.

8. The method of claim 7, wherein the virtual controller is configured to move along a lateral direction in response to a yaw movement of the physical controller.

9. The method of claim 7, wherein the virtual controller is configured to move along a vertical direction in response to a pitch movement of the physical controller.

10. The method of claim 7, wherein the virtual controller is configured to rotate about an axis along which the physical controller is longitudinally aligned in response to a roll movement of the physical controller.

11. The method of claim 7, further comprising re-defining the location of the joint if a location of the user is detected.

12. An apparatus comprising:
- a head mounted display (HMD) used to view a virtual environment;
- a physical controller configured to interact with an object in the virtual environment; and
- a processor programmed to:
  - determine a location of the HMD of a user;
  - define a location of a first joint and a second joint based on the location of the HMD;
  - define a first segment between the first joint and the second joint;
  - define a second segment extending from the second joint; and
  - define a change in a virtual location and a virtual orientation of a virtual controller in response to a change in an orientation of the physical controller, the virtual controller being fixed to an end of the second segment.

13. The apparatus of claim 12, wherein the virtual controller is configured to move along a lateral direction in response to a yaw movement of the physical controller.

14. The apparatus of claim 12, wherein the virtual controller is configured to move along a vertical direction in response to a pitch movement of the physical controller.

15. The apparatus of claim 12, wherein the virtual controller is configured to rotate about an axis along which the physical controller is longitudinally aligned in response to a roll movement of the physical controller.

16. The apparatus of claim 12, wherein the processor is further programmed to re-define the location of the first joint or the second joint if a location of the user is detected.

* * * * *